N. E. HIRSCH.
BRAKE.
APPLICATION FILED SEPT. 16, 1912.
1,145,416.
Patented July 6, 1915.
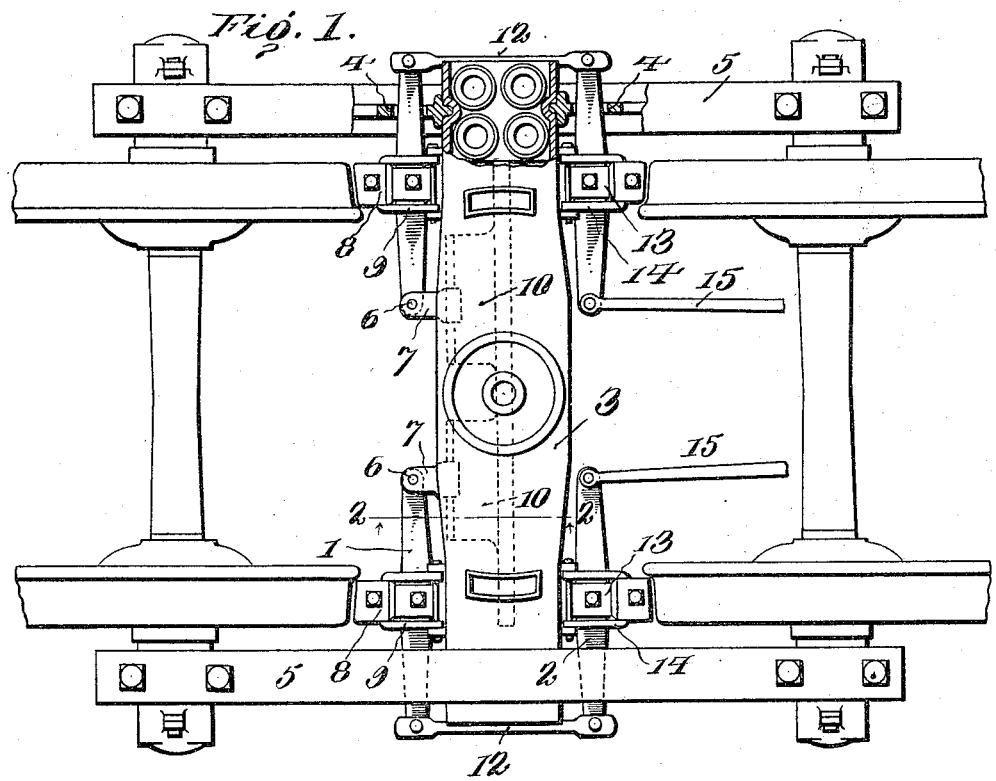
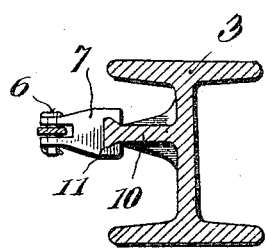
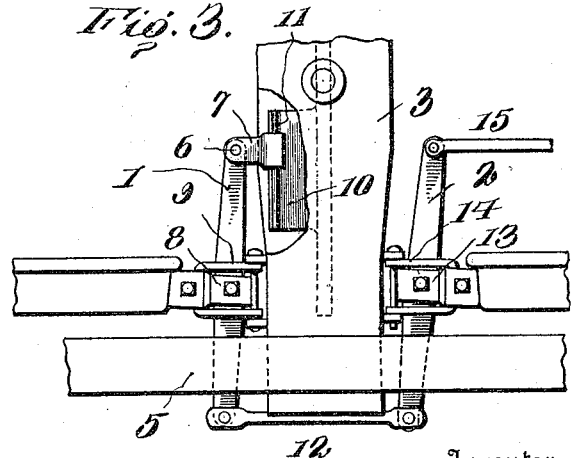
Witnesses
James F. Fitz Gibbon
J. R. Nottingham
Inventor
Nicholas E. Hirsch
By Helge Ott Munday
his Attorney

UNITED STATES PATENT OFFICE.

NICHOLAS E. HIRSCH, OF WILMINGTON, DELAWARE.

BRAKE.

1,145,416.　　　Specification of Letters Patent.　　Patented July 6, 1915.

Application filed September 16, 1912. Serial No. 720,593.

*To all whom it may concern:*

Be it known that I, NICHOLAS E. HIRSCH, a citizen of the United States, residing at Wilmington, in the county of New Castle and State of Delaware, have invented certain new and useful Improvements in Brakes, of which the following is a specification.

This invention relates to brakes, and more particularly to an improved arrangement of braking levers and their pivotal connections.

One of the prime objects of this invention is to provide a system of brake levers which can be readily adjusted in proportion and according to the braking power desired.

Another object of this invention is the production of a system of brake levers in which some of the levers can be easily removed and others substituted therefor, thereby varying the sizes of the said levers and the location of their pivotal connections in providing the required braking power for cars of different capacities.

Other objects of the invention will become apparent upon a complete disclosure thereof.

The invention therefore consists in the arrangement and combination of parts hereinafter described and pointed out in the appended claims.

In the accompanying drawings, Figure 1 is a top plan view of a car truck with the improved braking levers in position; Fig. 2 is a detail sectional view on line 2—2 of Fig. 1 through the adjustable pivot block; Fig. 3 is a detail plan view of a larger braking lever, showing the pivot block in an adjusted position, and the position of the brakes when applied to the wheels.

The present invention is primarily intended for use in connection with a car truck constructed along the lines indicated in my co-pending application filed Aug. 24, 1912, Serial Number 716,893, but is not limited to such application only, as it may be readily applied to any and all types of car trucks.

Referring to the drawings, the braking levers and their attending parts, as shown in Fig. 1, are the same upon each side of the truck, so as to equalize the braking power when applied.

The brake levers 1 and 2 are arranged upon each side of the bolster 3 and extend through openings 4 in the side frames 5, to the outside of the truck. These openings 4 are formed in the column posts of the side frames, and serve as guides for the brake levers. The levers are pivoted at 6 to adjustable pivot blocks 7 and are free to swing therein, as the brakes are applied or released. Positioned upon the brake levers 1 are the brake shoes 8, which are suspended within the hangers 9, secured to and extending from the bolster. The brake shoes are positioned within the hangers and operate upon the wheels. The pivot blocks 7 are adjustably mounted upon projecting plates 10, extending from the bolster, as shown in Fig. 2. The guides 11 upon which the blocks slide, are of dove-tail formation and long enough to accommodate varying sizes of brake levers for different loads, but they are not limited to such design only, and may be of any other suitable cross-section desired. To the outer end of the brake levers 1, are pivotally connected links 12, the opposite ends of which are pivotally connected to the brake levers 2. The brake levers 2 are similar in formation to the brake levers 1, and receive brake shoes 13, which are suspended within the hangers 14 extending from the bolster. The inner ends of the brake levers 2 are connected to the operating rods 15 which latter are in turn connected to the usual brake operating mechanism, not shown.

As illustrated in Fig. 3 a longer brake lever 1 is provided, whereby a greater braking power is obtained. This increased braking power is secured by reason of the distance between the brake shoe and the pivotal connection being lengthened. As the brake lever 1 is increased or diminished in length, according to the load, the pivot block must of necessity accommodate itself therewith, and in so doing provides an adequate and properly proportioned braking power commensurate with the capacity of the car. Thus it will be obvious that the proper braking power can always be secured through the adjustment of the pivot blocks according to the length of the braking levers used; also it will be seen that the usual brake beam which is now used for fulcruming the brake levers is eliminated, and the pivot blocks from which the braking levers operate are adjustably positioned upon extensions from the bolster.

From the present arrangement of the several braking levers and their attending parts, it will be apparent that the present design will be inducive to the highest degree of safety, thereby avoiding loss of life and injury which so frequently results from one being compelled to repair parts of the braking system beneath the car.

Having thus fully described my invention, what I claim is:

1. The combination with a car truck having side frames and a bolster, of a plurality of brake levers, brake shoes carried by the levers, brake hangers for said brake shoes, connecting links for the brake levers, pivot blocks mounted upon the bolster and pivotally supporting some of the brake levers, said bolster being provided with projecting plates, and each of said pivot blocks being formed with a recess which receives a projecting plate of the bolster.

2. The combination with a car truck, having side frames and a bolster, of a plurality of brake levers, brake shoes carried by the levers, connecting links for the brake levers, pivot blocks mounted upon the bolster and pivotally supporting some of the brake levers, said bolster being provided with projecting plates, said pivot blocks being formed with recesses which receive the projecting plates of the bolster, and means interposed between the brake shoes and bolster for retaining the pivot blocks in fixed position with respect to the bolster.

3. The combination with a car truck having side frames and a bolster, of a plurality of brake levers, brake shoes carried by the levers, connecting links for the brake levers, hangers for said brake shoes, pivot blocks mounted upon the bolster and pivotally supporting some of the brake levers, said bolster being provided with imperforate projecting plates, and each of said pivot blocks being formed with a recess which receives the imperforate projecting plate of the bolster.

4. The combination with a car truck, of a bolster having a member which is centrally cut away, pivot blocks formed with recesses, and adapted to be moved upon the member, brake levers some of which are pivoted to said pivot blocks, brake lever connections and brake shoes operated by the said levers.

5. The combination with a car truck, of a bolster, brake levers, pivot blocks carried by the bolster and supporting some of said brake levers, said bolster and pivot blocks being provided with interlocking mating portions for retaining the said pivot block upon the bolster, and means including a brake lever for retaining each of the pivot blocks in fixed position with respect to the bolster.

6. In a brake rigging including a bolster and levers supported thereby, a member connecting a lever of the rigging in operative position to the bolster, said member being provided with a recessed portion adapted to engage a section of the bolster whereby said member may be slidably adjusted longitudinally thereon.

In testimony whereof I affix my signature in presence of two witnesses.

NICHOLAS E. HIRSCH.

Witnesses:
JAMES W. ROBERTSON.
CHARLES GREEN.

Copies of this patent may be obtained for five cents each, by addressing the "Commissioner of Patents, Washington, D. C."